(12) United States Patent
Tokuyama et al.

(10) Patent No.: US 9,681,008 B2
(45) Date of Patent: Jun. 13, 2017

(54) SHEET CONVEYING APPARATUS AND IMAGE READING APPARATUS

(71) Applicant: CANON KABUSHIKI KAISHA, Tokyo (JP)

(72) Inventors: Kaneto Tokuyama, Tokyo (JP); Yasuhito Tsubakimoto, Tokyo (JP); Hikaru Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/973,998

(22) Filed: Dec. 18, 2015

(65) Prior Publication Data

US 2016/0191719 A1 Jun. 30, 2016

(30) Foreign Application Priority Data

Dec. 26, 2014 (JP) ................ 2014-264542

(51) Int. Cl.
*H04N 1/00* (2006.01)
*B65H 5/06* (2006.01)
(Continued)

(52) U.S. Cl.
CPC ......... *H04N 1/0032* (2013.01); *B65H 3/0669* (2013.01); *B65H 3/0684* (2013.01);
(Continued)

(58) Field of Classification Search
CPC ............... H04N 1/0032; H04N 1/0057; H04N 1/00522; H04N 1/00551; H04N 2201/0094; B65H 3/06; B65H 5/06; B65H 2801/16; B65H 3/0669; B65H 3/0684; B65H 3/5223; B65H 2301/3122; B65H 2402/441; B65H 2403/42; B65H 2405/3321; B65H 2551/26; B65H 2551/27
(Continued)

(56) References Cited

U.S. PATENT DOCUMENTS 6,122,105 A * 9/2000 Kawai ................ H04N 1/02835
359/611
6,152,561 A 11/2000 Watanabe
(Continued)

FOREIGN PATENT DOCUMENTS

CN 103227885 A 7/2013
CN 103997583 A 8/2014
(Continued)

OTHER PUBLICATIONS

Chinese Office Action issued in corresponding Chinese Application No. 20151098336.9 dated Jan. 22, 2017.

*Primary Examiner* — Allen H Nguyen
(74) *Attorney, Agent, or Firm* — Fitzpatrick, Cella, Harper & Scinto

(57) ABSTRACT

An operation panel is integrated into a conveying unit, and the operation panel and a conveying roller are displaced with respect to each other in a sheet width direction crossing a sheet conveying direction. The operation panel and the conveying roller are located in a manner at least partly overlapping each other in the sheet conveying direction and a height direction in the conveying unit. Further, the operation panel and the conveying roller are at least partly located within a range of a width of a sheet conveying area by the conveying unit.

13 Claims, 13 Drawing Sheets

(51) Int. Cl.
  *B65H 3/06* (2006.01)
  *B65H 3/52* (2006.01)
(52) U.S. Cl.
  CPC ......... *B65H 3/5223* (2013.01); *H04N 1/0057* (2013.01); *H04N 1/00522* (2013.01); *H04N 1/00551* (2013.01); *B65H 2301/3122* (2013.01); *B65H 2402/441* (2013.01); *B65H 2403/42* (2013.01); *B65H 2405/3321* (2013.01); *B65H 2551/26* (2013.01); *B65H 2551/27* (2013.01); *B65H 2801/06* (2013.01); *H04N 2201/0094* (2013.01)
(58) Field of Classification Search
  USPC ........................................................ 358/1.12
  See application file for complete search history.

(56) References Cited

U.S. PATENT DOCUMENTS

| | | | |
|---|---|---|---|
| 6,244,588 | B1 | 6/2001 | Tsubakimoto et al. |
| 8,797,613 | B2 | 8/2014 | Sato et al. |
| 2005/0194731 | A1* | 9/2005 | Ohama ................... H04N 1/04 271/10.11 |
| 2006/0180992 | A1* | 8/2006 | Asada .................. B65H 3/0661 271/121 |
| 2008/0050138 | A1* | 2/2008 | Yamazaki ........... G03G 15/235 399/69 |
| 2009/0161175 | A1* | 6/2009 | Fujishita ............ H04N 1/00002 358/474 |
| 2013/0063750 | A1* | 3/2013 | Osakabe ............ H04N 1/00588 358/1.13 |
| 2013/0162728 | A1* | 6/2013 | Kobayashi ............... B41J 29/02 347/85 |
| 2014/0035986 | A1* | 2/2014 | Adachi .................... B41J 15/00 347/16 |
| 2015/0116791 | A1* | 4/2015 | Tochigi ................ H04N 1/1039 358/475 |

FOREIGN PATENT DOCUMENTS

| | | |
|---|---|---|
| EP | 1676797 A1 | 7/2006 |
| JP | 05-063932 A | 3/1993 |

* cited by examiner

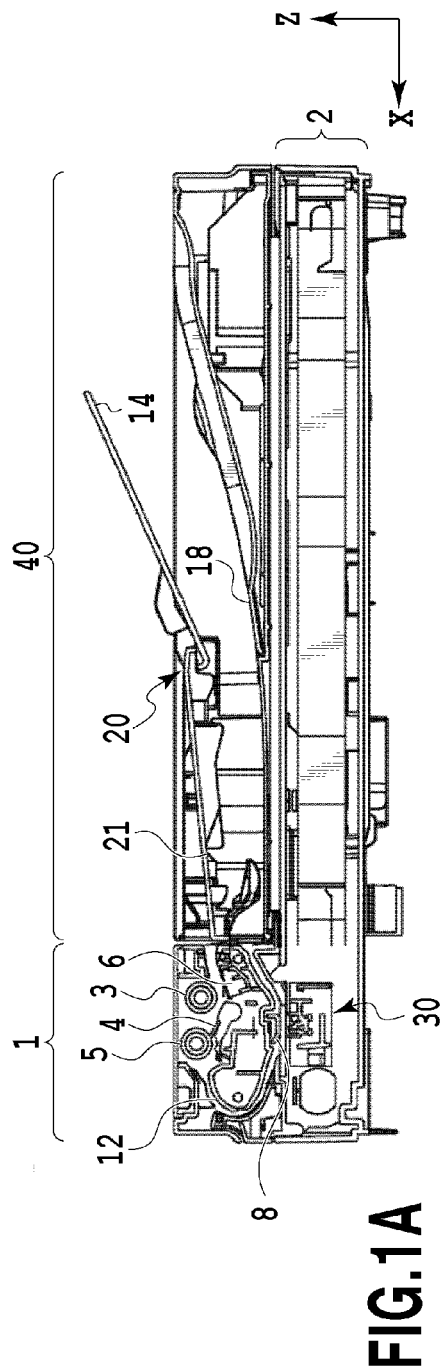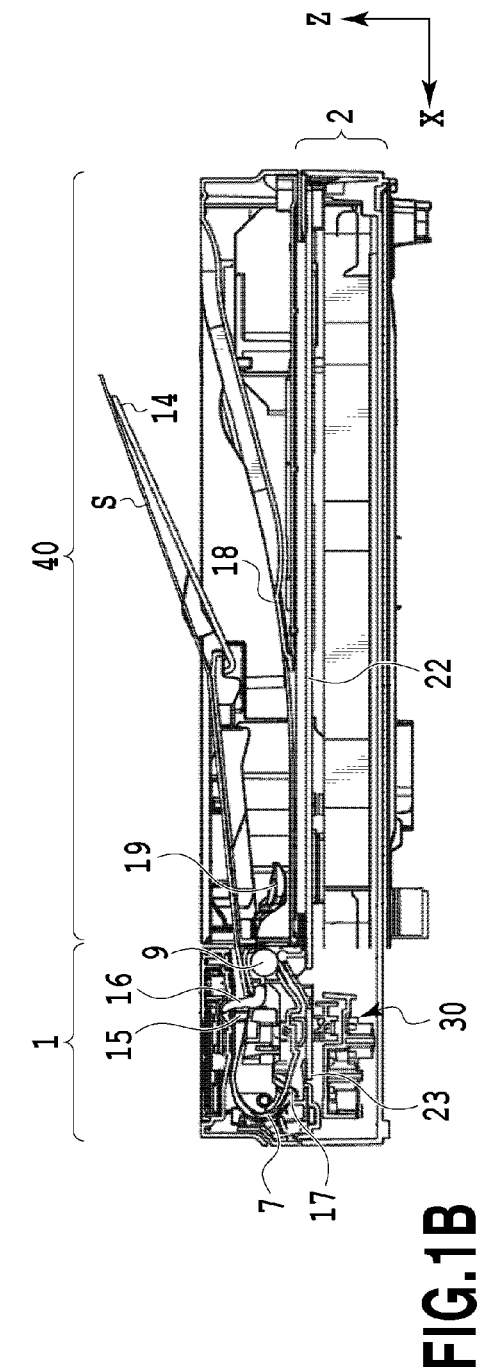

SHEET CONVEYING APPARATUS AND IMAGE READING APPARATUS

BACKGROUND OF THE INVENTION

Field of the Invention

The present invention relates to a sheet conveying apparatus in an apparatus having a reading unit and a printing unit.

Description of the Related Art

In some image reading apparatuses used for a copying machine, a facsimile machine, a multifunction printer, a document scanner, and the like, an automatic document feeder (hereinafter also referred to as an ADF) is installed. The ADF device has a sheet conveying mechanism for conveying loaded sheet documents one by one. Image information on the document conveyed by the sheet conveying mechanism is read in a reading unit in the image reading apparatus.

The image reading apparatus often has, on its exterior, an operation panel serving as a user interface for powering on/off or reading images.

Japanese Patent Laid-Open No. Hei 5-63932 (1993) discloses a configuration in which an operation panel is disposed on a top surface of its exterior.

SUMMARY OF THE INVENTION

In the configuration disclosed in Japanese Patent Laid-Open No. Hei 5-63932 (1993), however, the operation panel is disposed in an area above a sheet conveying mechanism which is provided above a reading unit. Accordingly, the size of an apparatus increases in a height direction by the size of the operation panel provided on the apparatus. Meanwhile, if the operation panel is disposed in an area not above the reading unit, the size of the entire apparatus is likely to increase as viewed on a horizontal plane.

The present invention has been made to solve the above problems. An object of the present invention is to provide a sheet conveying apparatus which is downsized as compared with conventional sheet conveying apparatuses and an image reading apparatus.

The sheet conveying apparatus of the present invention includes: a conveying unit configured to convey a sheet, the conveying unit including a roller and a driving source; and an operation panel, wherein the operation panel is integrated into the conveying unit, and the operation panel and the roller are displaced with respect to each other in a sheet width direction crossing a sheet conveying direction.

According to the present invention, there is provided a sheet conveying apparatus which is downsized as compared with conventional sheet conveying apparatuses and an image reading apparatus provided with the sheet conveying apparatus.

Further features of the present invention will become apparent from the following description of exemplary embodiments (with reference to the attached drawings).

BRIEF DESCRIPTION OF THE DRAWINGS

FIGS. 1A and 1B are cross-sectional views showing an internal configuration of a reading apparatus;

DESCRIPTION OF THE EMBODIMENTS

As an embodiment of the present invention, a description will be given of an image reading apparatus having a sheet conveying apparatus. The image reading apparatus is applicable not only to a stand-alone scanner device but also to a multifunction device incorporating the scanner device into a copying machine, a printer, a facsimile machine, and the like. In the present specification, these devices are collectively referred to as the image reading apparatus.

(Configuration of the Image Reading Apparatus)

Figure 2:
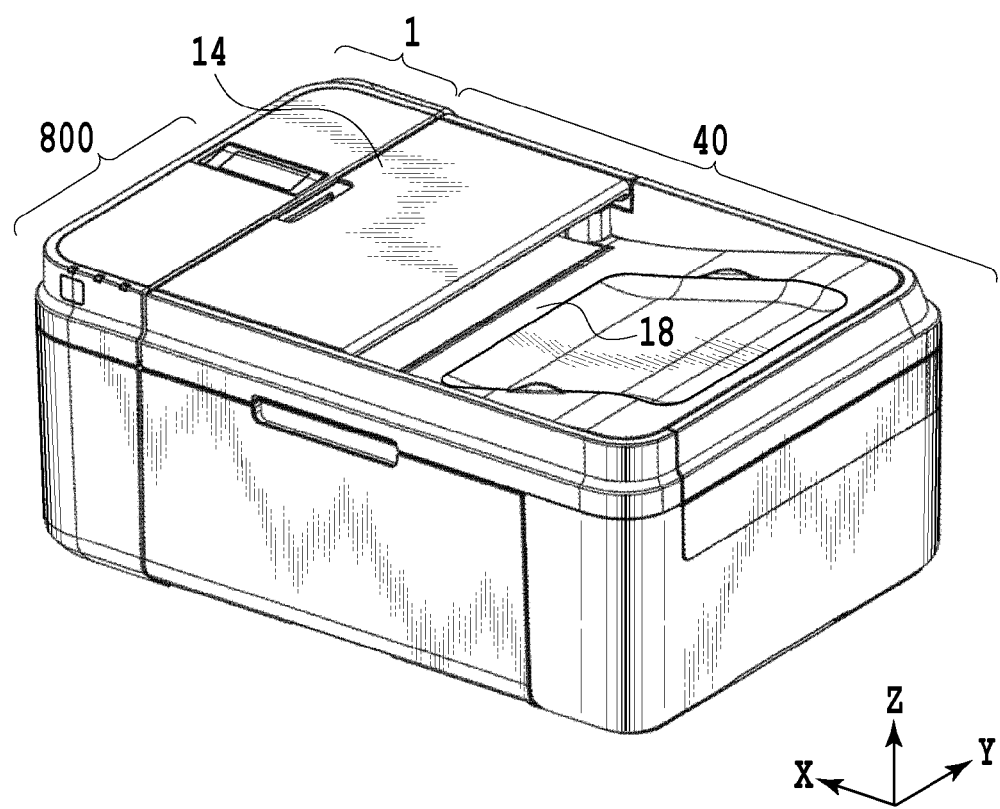
FIG. 2 is a perspective view showing an outer appearance of the reading apparatus equipped with a printing unit.
Figure 3:
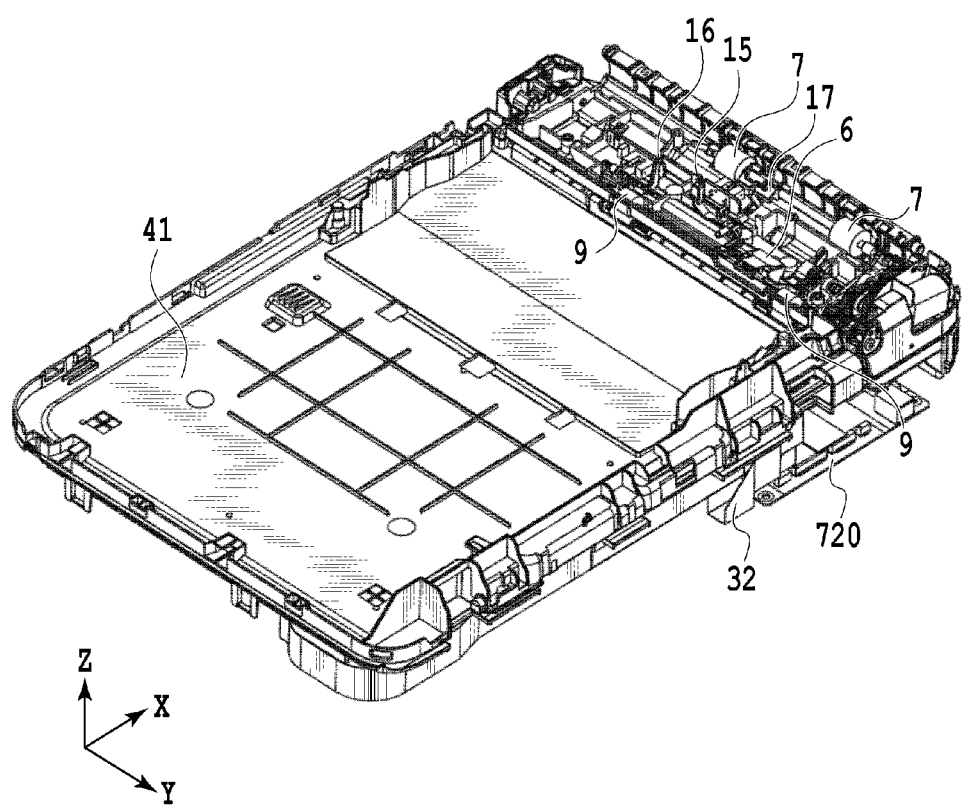
FIG. 3 is a perspective view of the reading apparatus in a state in which an outer cover is removed.

FIGS. 1A and 1B (hereinafter also collectively referred to as FIG. 1) show vertical cross sections of an internal structure of the image reading apparatus according to an embodiment of the present invention. FIGS. 1A and 1B are cross-sectional views taken from different positions. FIG. 2 is a perspective view showing an outer appearance of the image reading apparatus equipped with a printing unit according to the embodiment of the present invention. FIG. 3 is a view of the image reading apparatus in a state in which an outer cover is removed according to the present embodiment.

As shown in FIGS. 1 and 2, the image reading apparatus (hereinafter also referred to as the reading apparatus) of the present embodiment includes a document reading conveying unit 1, a document loading pressing plate unit 40, a book document reading unit 2, and an operation panel unit 800.

(The Conveying Unit)

The document reading conveying unit (hereinafter also referred to as the conveying unit) 1 is a unit for conveying a sheet document S and reading image information. The conveying unit 1 has a document conveying path (hereinafter also referred to as a U-turn path) 12 therein which extends in a U-shape. The conveying unit 1 can convey the document S having a size within a range of the width of the U-turn path 12.

As shown in FIGS. 1 and 3, in the U-turn path 12, a document stopper 15, a document presence/absence sensor 16, a document edge sensor 17, and the like are installed. The document stopper 15 restricts, to a predetermined position, a position of a leading end of the document S before conveyed. The document presence/absence sensor 16 detects the presence or absence of the document S conveyed.

The document edge sensor 17 detects a leading end portion and a rear end portion of the conveyed document S.

(The Open/Close Unit)

As shown in FIGS. 1 and 2, the document loading pressing plate unit (hereinafter also referred to as the open/close unit) 40 is a unit for placing the document S to be conveyed to the conveying unit 1, and also a unit for pressing, from above, a document B placed on the top surface of the book document reading unit 2. The open/close unit 40 is located adjacent to the conveying unit 1 and is provided above the book document reading unit 2.

The open/close unit 40 has, on its upper surface, a document placement tray (hereinafter also referred to as a supply tray) 14 and a document discharge tray (hereinafter also referred to as a discharge tray) 18.

The supply tray 14 is attached to a document placement member 21 by a hinge (not shown) and is rotatable around a hinge axis. Rotation allows the supply tray 14 to be switched between a closed state shown in FIG. 2 and an open state shown in FIG. 1. A surface of the supply tray 14 that appears on the upper surface when the supply tray 14 is open and the top surface of the document placement member 21 form a document placement unit 20 for loading the document S. The supply tray 14 is closed when it is not used, so as to form the same horizontal plane as the conveying unit 1 and not to deviate from the conveying unit 1. More specifically, when both the conveying unit 1 and the open/close unit 40 are closed, the top surface (an operation surface of the operation panel unit 800) of the conveying unit 1 and the top surface (the closed supply tray 14) of the open/close unit 40 have substantially the same height and there is no difference in level near the boundary between the conveying unit 1 and the open/close unit 40.

The document placement unit 20 is provided so as to be connected to an upstream end of the U-turn path 12 of the conveying unit 1 in a case where both the conveying unit 1 and the open/close unit 40 are closed. The discharge tray 18 is provided so as to be connected to a downstream end of the U-turn path 12 of the conveying unit 1 in a case where both the conveying unit 1 and the open/close unit 40 are closed.

Figure 5:
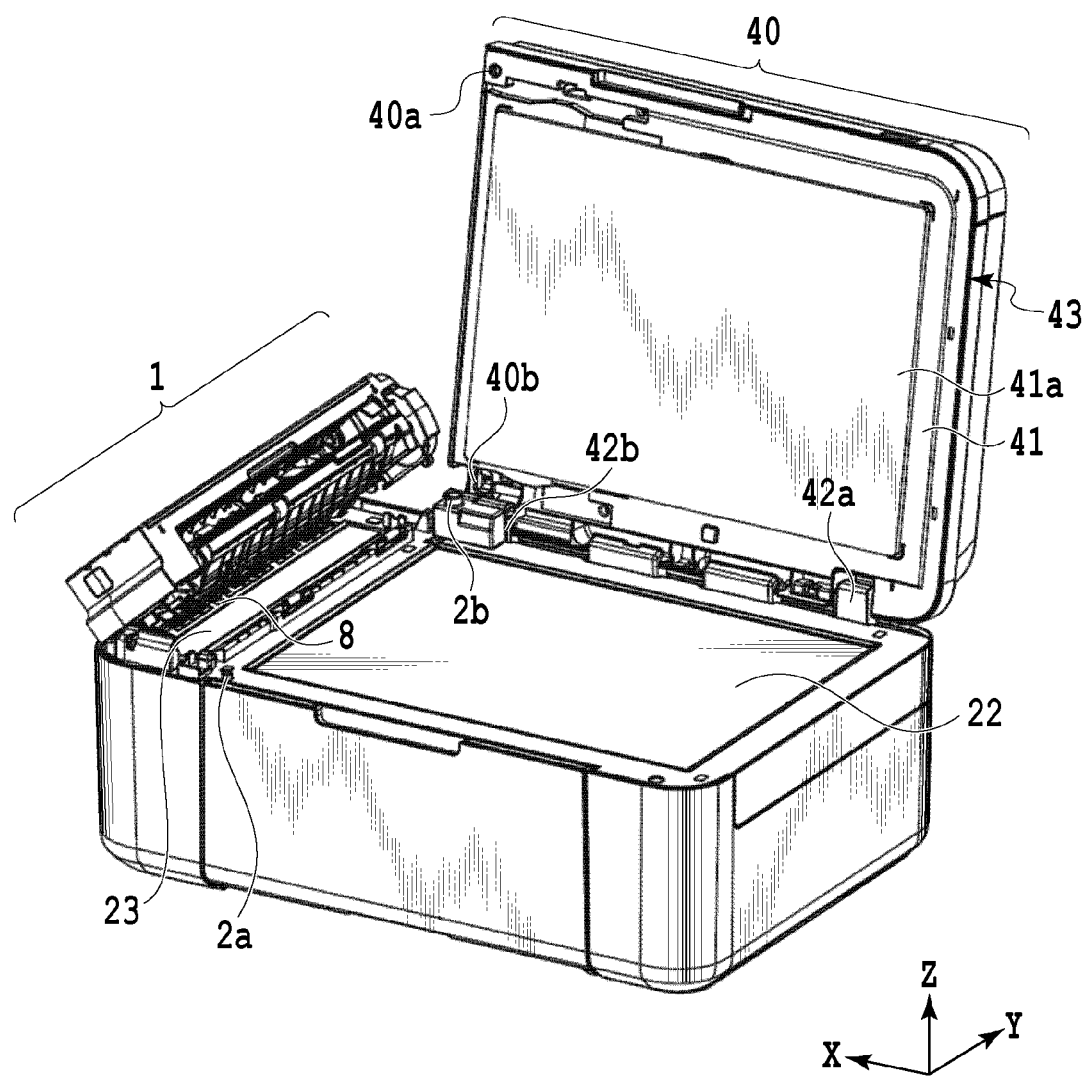
FIG. 5 is a perspective view showing the reading apparatus in which a sheet conveying unit and an open/close unit are open.

As shown in FIG. 5, a rear portion of the open/close unit 40 is provided with hinges 42a and 42b. The open/close unit 40 rotates around the hinges 42a and 42b so as to be switched between an open state shown in FIG. 5 and a closed state shown in FIG. 2. Likewise, the conveying unit 1 can also be open with respect to a document platen. The conveying unit 1 is closed as shown in FIG. 2 in normal use. If there is a conveying jam of a document sheet, a user opens the conveying unit 1 as shown in FIG. 5 to remove the jammed document. Rotation axes of the open/close unit 40 and the conveying unit 1 are orthogonal to each other, and they open in different directions.

(The Book Document Reading Unit 2)

The book document reading unit 2 located below the open/close unit 40 has, on its top surface, a glass plate 22 of the document platen, and serves as a unit for reading, through the glass plate 22, image information on the document B placed still on the glass plate 22 of the document platen. The document B may be in the form with a certain thickness, such as a booklet, or may be in the form of a sheet.

(The Sheet Conveying Mechanism)

Referring back to FIG. 1, a description will be given of the sheet conveying mechanism of the conveying unit 1 according to the present embodiment. As shown in FIG. 1, the upstream end of the U-turn path 12 is provided with a pickup roller 3. The pickup roller 3 abuts on the top sheet of the document S loaded on the document placement unit 20 to pick up the top sheet. On a downstream side of the pickup roller 3, there are provided a separation roller 5 and a separation pad 4 which press and abut against each other. The separation roller 5 and the separation pad 4 separate one sheet of the document S which has been picked up by the pickup roller 3.

As shown in FIGS. 1 and 3, in the middle of the U-turn path 12, a first conveying roller 7 is provided, and on the downstream end of the U-turn path 12, there is provided a second conveying roller 9 for discharging the document S to the discharge tray 18. The document S conveyed within the U-turn path 12 of the conveying unit 1 by rotation of the first conveying roller 7 is discharged to the discharge tray 18 along a discharge guide 19 by rotation of the second conveying roller 9.

(Configuration for Reading)

Reading of image information in the conveying unit 1 and the book document reading unit 2 is performed by a contact image sensor (hereinafter also referred to as a CIS) 30.

As shown in FIGS. 1 and 3, the CIS 30 is located below the conveying unit 1 and the open/close unit 40, across a glass 23 and the glass plate 22 from the conveying unit 1 and the open/close unit 40, respectively. In this example, the glass 23 and the glass plate 22 are separate components, but the glass 23 and the glass plate 22 may be formed as one unit. Further, material is not limited to glass, and any material, such as plastic, through which a sensor can read image information on a document may be used.

The CIS 30 irradiates a reading surface on which image information on the document S is read (hereinafter also referred to as an image information surface) with light from a mounted LED and focuses light reflected on the image information surface by a self-focusing rod lens array to form an image on a sensor element, thereby reading image information. The CIS 30 is movable in a lateral direction (a direction in X direction) in FIG. 1.

In an ADF scanner unit, in a case where reading is performed in the conveying unit 1 (ADF scan), the CIS 30 is kept stopped at a sheet document reading position (reading position) as shown in FIG. 1 and reads, through the glass 23, the surface of the document S that is conveyed to the reading position. At a position opposite to the reading position with respect to the glass 23, a reading white plate 8 is provided. The reading white plate 8 can be used for backing when reading a document and for calibration of the CIS 30, for example.

In a flatbed scanner unit, in a case where reading is performed in the book document reading unit 2 (FBS scan), while scanning from left to right (−X direction) in FIG. 1, the CIS 30 reads, through the glass plate 22, the surface of the document B that is placed on the glass plate 22.

(The Driving System of the Reading Apparatus)

Figure 4A:
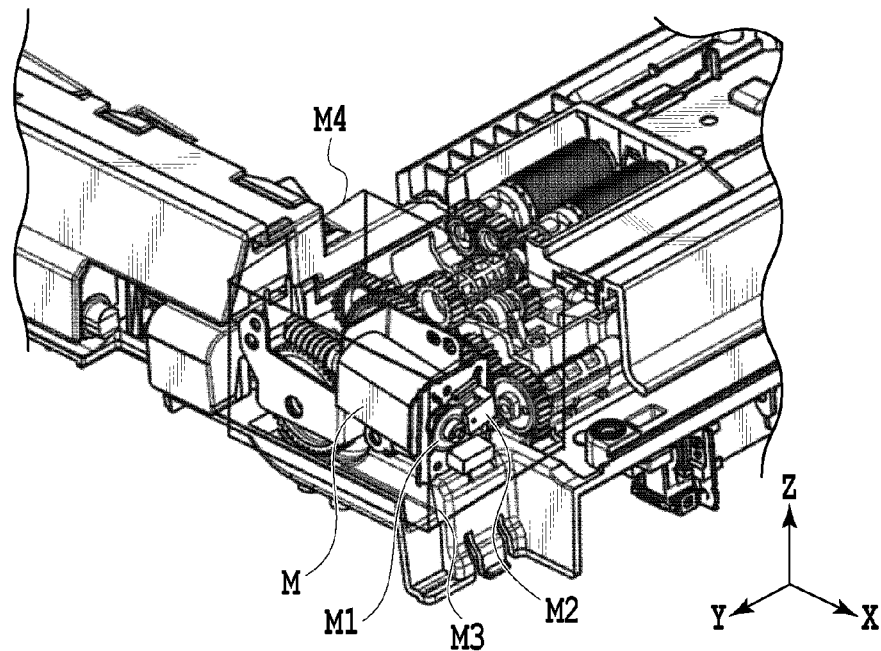
FIGS. 4A and 4B are perspective views showing a driving system of a sheet conveying mechanism of the reading apparatus.
Figure 4B:
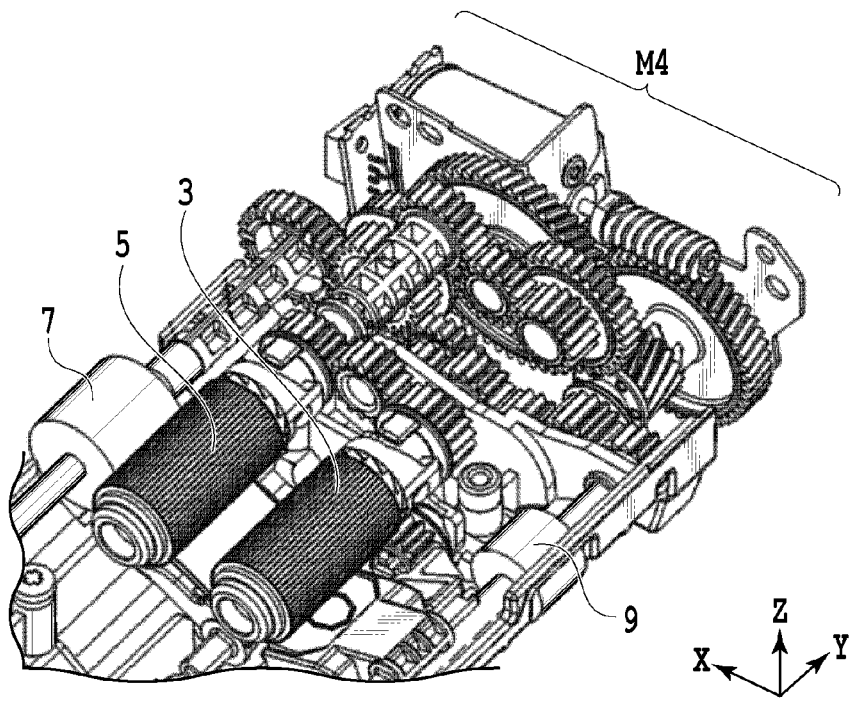

With reference to FIGS. 4A and 4B (hereinafter also collectively referred to as FIG. 4), a description will be given of a driving system of the reading apparatus according to the present embodiment. A drive motor M is a brushed DC motor. A code wheel film M1, an encoder sensor M2, and a rotary encoder M3 are provided near the drive motor M.

More specifically, the code wheel film M1 is provided on a motor shaft of the drive motor M and rotates in association with the rotation of the motor shaft. The encoder sensor M2 detects and reads a slit pattern printed on the code wheel film M1. The rotary encoder M3 detects a rotation amount based on the reading by the encoder sensor M2. Based on a pulse signal from the encoder M3, rotation of the drive motor M is controlled by pulse-width modulation (PWM) control.

A driving force of the drive motor M is transmitted to the separation roller 5, the pickup roller 3, the first conveying roller 7, and the second conveying roller 9 by a gear train M4. In the present embodiment, the gear train M4 is not provided on the front side of the reading apparatus, but is disposed closer to the back side. In a case where reading is performed in the conveying unit 1, all conveying rollers used for the automatic document feeder (ADF) are rotated by the gear train M4.

(The ADF Scan)

With reference to FIGS. 1 to 4, a description will be given of a series of flow while a reading operation is performed by the conveying unit 1 (i.e., during ADF scan).

If an operator instructs to start reading from the operation panel unit 800, the drive motor M rotates. In association with the rotation, the separation roller 5 and the pickup roller 3 rotate, thereby lifting up a document lifter 6, and the pickup roller 3 is pressed by the document S. Rotation of the pickup roller 3 releases the document stopper 15, and the document S is fed into the U-turn path 12. The document S loaded on the document placement unit 20 is separated one by one by the separation roller 5 and the separation pad 4 of the conveying unit 1, and the top sheet of the document S is conveyed.

In this example, the separation roller 5 rotates at a peripheral speed that is lower than those of the first conveying roller 7 and the second conveying roller 9. Accordingly, if the drive motor M is continuously rotated, there is a predetermined interval between the first sheet of the document S and the second sheet of the document S.

The separated top sheet of the document S is conveyed along the U-turn path, and is further conveyed by the first conveying roller 7 to the position at which the sheet is read by the CIS 30.

The conveying unit 1 starts and finishes reading of the image information upon detection of an end portion of the document S by the document edge sensor (hereinafter also referred to as the DES) 17 as a trigger. More specifically, if a leading end portion of the document S is detected by the DES 17, at a timing at which the document S is conveyed from the detection position by a predetermined amount, the CIS 30 starts reading of the image information on the surface of the document S at the reading position. Then, if a rear end portion of the document S is detected by the DES 17, at a timing at which the document S is conveyed from the detection position by a predetermined amount, the CIS 30 finishes reading of the image information. From the start to the end of the reading of the image information, the reading operation is continued while the document S is conveyed.

If there is a subsequent sheet of the document S, the drive motor M is continuously rotated to read the next sheet of the document S. The presence or absence of the next sheet of the document is detected by the document presence/absence sensor 16. In the same manner, the document conveyance is continued to read the image information on the subsequent sheet of the document S until the document presence/absence sensor 16 detects that there is no subsequent sheet of the document S.

After read by the CIS 30, the document S is discharged to the discharge tray 18 by the rotation of the second conveying roller 9, while being guided by the discharge guide 19 provided on the open/close unit 40.

(Control Configuration of the Reading Apparatus)

Figure 6:
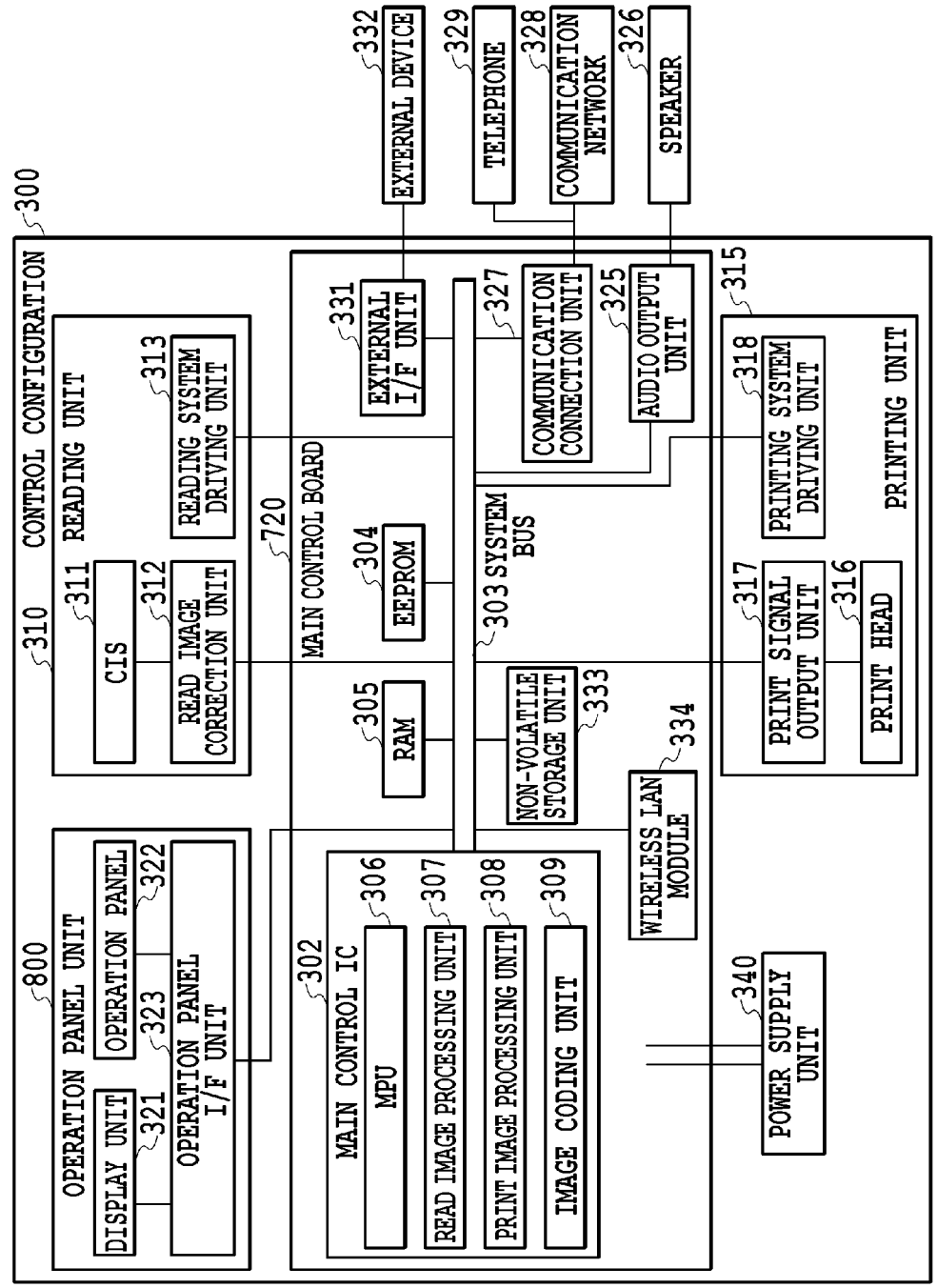
FIG. 6 is a block diagram showing a control configuration of the reading apparatus equipped with the printing unit.

FIG. 6 is a block diagram showing a control configuration of the reading apparatus.

A control configuration 300 includes a main control board 720, a reading unit 310, the operation panel unit 800, a printing unit 315, and a power supply unit 340.

The main control board 720 includes a main control IC 302, an EEPROM 304, a RAM 305, an external interface unit 331, a non-volatile storage unit 333, a wireless LAN module 334, an audio output unit 325, a communication connection unit 327, and a system bus 303 for connecting these components.

The main control IC 302 includes a microprocessor unit (hereinafter also referred to as an MPU) 306, a read image processing unit 307, a print image processing unit 308, and an image coding unit 309, and controls the entire apparatus via the system bus 303. The EEPROM 304 stores a program code for operating the MPU 306, initial-value data, table data, and the like. The RAM 305 is used for a calculation buffer, an image memory, and the like.

The reading unit 310 includes a CIS 311, a read image correction unit 312, a reading system driving unit 313, and the like. The reading unit 310 drives the reading system driving unit 313 to move the CIS 311, causes the CIS 311 to optically and sequentially read the document, and converts the read information into an electrical image signal. The read image correction unit 312 performs shading correction or the like on the signal. The corrected signal is transmitted to the main control board 720 and is subjected to image processing in the read image processing unit 307, and high resolution image data is outputted.

The printing unit 315 is an ink jet type in this example. The printing unit 315 drives a printing system driving unit 318 to move a print head 316 to a predetermined position, and image data generated in the print image processing unit 308 is outputted to the print head 316 via a print signal output unit 317, whereby an image is printed.

The operation panel unit 800 outputs a display image to a display unit 321 via an operation panel interface unit 323, and accepts an operation input from an operation panel 322.

The audio output unit 325 converts audio data into a signal and outputs message audio from a speaker 326. The communication connection unit 327 is connected to a communication network 328 and a telephone 329, through which audio and coded data are inputted and outputted.

The coded data is converted into an image and vice versa in the image coding unit 309. For example, the external interface unit 331 such as a USB standard is connected to an external device 332 such as a personal computer.

The non-volatile storage unit 333 consists of a non-volatile memory such as a flash memory and stores work data and image data to avoid loss of the data in the event of a blackout or the like. The wireless LAN module 334 inputs and outputs an image via an access point outside the apparatus.

The power supply unit 340 supplies power required for the operations of the main control board 720, the reading unit 310, the printing unit 315, the operation panel unit 800, and the like.

(The Operation of the Reading Apparatus)

A description will be given of the operations that could be performed by the reading apparatus equipped with the printing unit of the present embodiment, such as a reading operation of image information, a copying operation, a facsimile transmitting operation, a facsimile receiving operation, and a printer operation.

(The Reading Operation)

Image information on the document read by the CIS 311 of the reading unit 310 is first subjected to shading correction or the like by the read image correction unit 312. The processed image information is made into image data by the read image processing unit 307, loaded into the RAM 305, and then compressed and coded into, for example, a JPEG format by the image coding unit 309. The coded data is outputted to the external device 332 through the external interface unit 331.

(The Copying Operation)

Image information on the document read by the CIS 311 of the reading unit 310 is subjected to shading correction or the like by the read image correction unit 312. The processed image information is made into image data by the read image processing unit 307 and loaded into the RAM 305. The loaded image data is compressed and coded into, for example, a JPEG format by the image coding unit 309 and temporarily stored. The stored image data is sequentially sent to the print image processing unit 308 and converted into an image for printing. The image for printing is outputted to the print head 316 via the print signal output unit 317 and thereby printed on a print paper.

(The Facsimile Transmitting Operation)

Image information on the document read by the CIS 311 of the reading unit 310 is subjected to shading correction or the like by the read image correction unit 312. The processed image information is made into image data by the read image processing unit 307 and loaded into the RAM 305. The loaded image data is compressed and coded into, for example, an MR (modified READ) format by the image coding unit 309 and temporarily stored. As for the stored image data, a procedure signal of a facsimile communication is transmitted and received in the communication connection unit 327, and then transmission of the image data is started. Reading is continued even after transmission is started, and the image data is kept being transmitted while being stored.

(The Facsimile Receiving Operation)

If there is an arrival of a facsimile from the communication network 328, a procedure signal of a facsimile communication is transmitted and received in the communication connection unit 327, and then reception of the image data is started. The received image data is modulated in the image coding unit 309 and loaded into the RAM 305. The loaded image data is sequentially sent to the print image processing unit 308 and converted into an image for printing. The image for printing is outputted to the print head 316 via the print signal output unit 317 and thereby printed on a print paper.

(The Printer Operation)

A command and a reception parameter transmitted from the external device 332 and received at the external interface unit 331 are interpreted by the MPU 306 and loaded into the RAM 305 as image data in the image coding unit 309. The loaded image data is sequentially sent to the print image processing unit 308 and converted into an image for printing. The image for printing is outputted to the print head 316 via the print signal output unit 317 and thereby printed on a print paper.

(Configurations of the Sheet Conveying Mechanism, the Operation Panel Unit, and the Frame)

Figure 7:
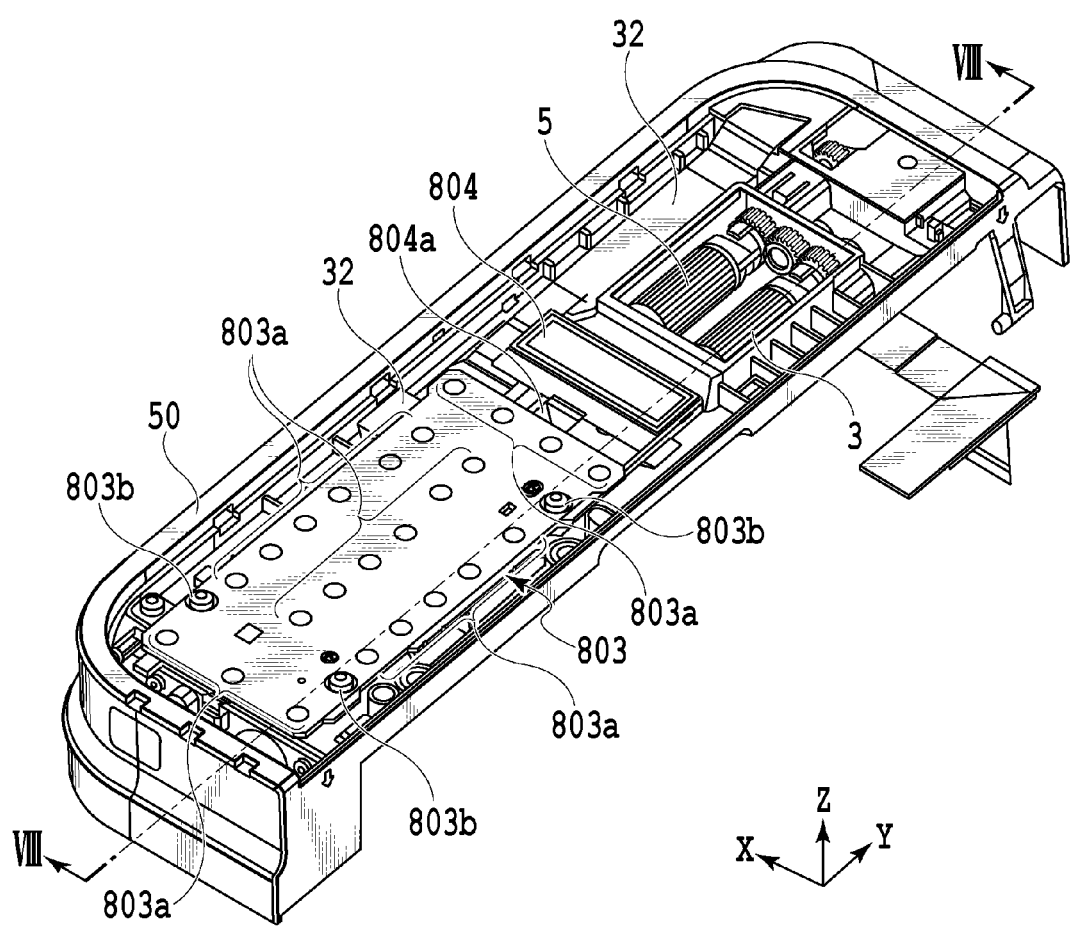
FIG. 7 is a perspective view showing an operation panel, the sheet conveying mechanism, and a frame of the reading apparatus.
Figure 8:
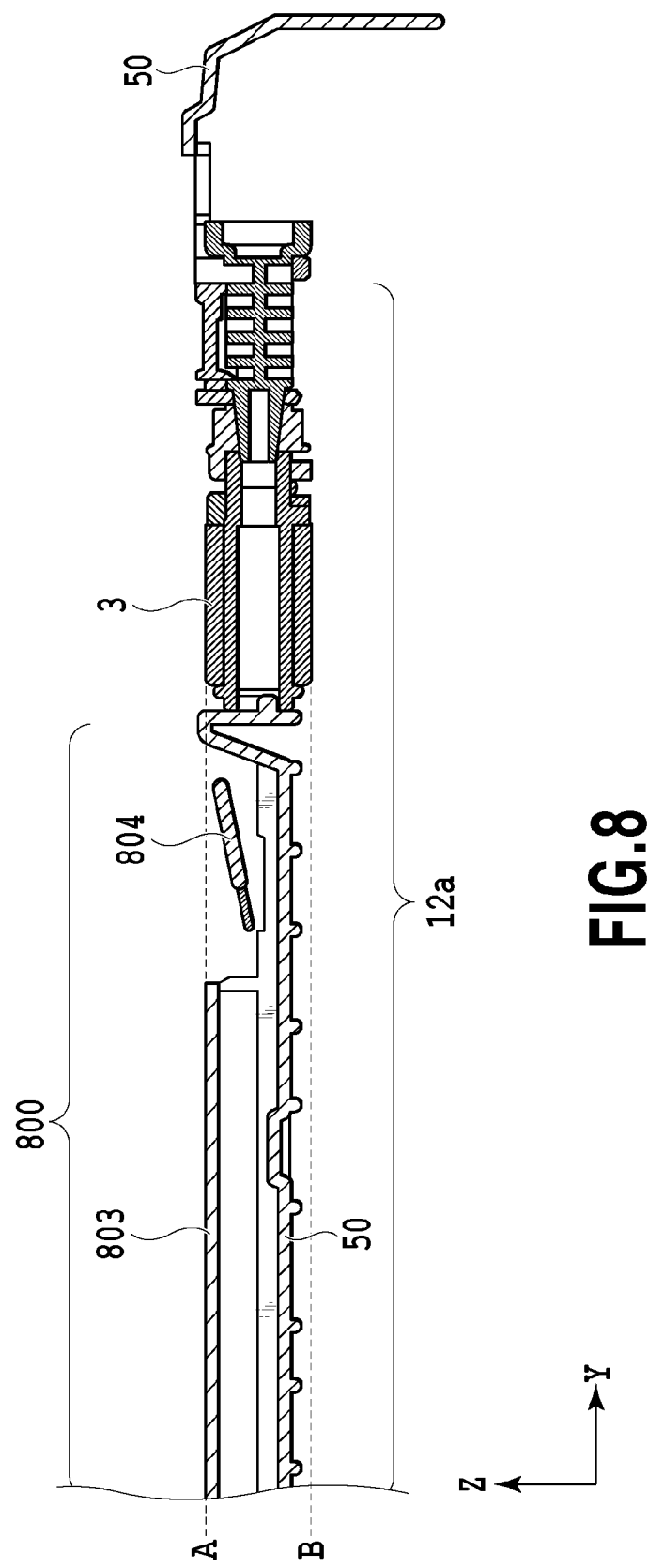
FIG. 8 is a cross-sectional view showing the operation panel, the sheet conveying mechanism, and the frame of the reading apparatus.

With reference to FIGS. 7 and 8, a description will be given of the configurations of the pickup roller 3, the separation roller 5, the operation panel unit 800, and a frame 50.

As shown in FIG. 7, the frame 50 supports the pickup roller 3, the separation roller 5, and the operation panel unit 800.

The pickup roller 3 and the separation roller 5 are individually supported by shafts (not shown) extending from the frame 50, and rotatable around the shafts.

A sub control board 803 which is disposed in the operation panel unit 800 and has control over the operation panel unit 800 abuts on the frame 50 and is supported by the frame 50. In FIG. 7, the sub control board 803 is fixed to the frame 50 by a screw 803b. However, using a supporting method which is different from the present configuration, such as pressure welding, welding, and snap fit, will not deviate from the present invention. The sub control board 803 has a plurality of board buttons 803a and has a function of transmitting an electrical signal to the main control board 720 when a pressing unit 802a (described later) located on the board button 803a is pressed.

Between the pickup roller 3 and the separation roller 5, and the sub control board 803, a display unit 804 for guiding a user operation by displaying characters and signs is provided. The display unit 804 is, for example, a liquid crystal display and is connected to the sub control board 803 via a flexible print circuit board (hereinafter also referred to as an FPC) 804a.

FIG. 8 is a cross-sectional view taken along the line running through the axis center of the pickup roller 3 shown in FIG. 7, which view is orthogonal to the sheet conveying direction. The frame 50, the pickup roller 3, the display unit 804, and the sub control board 803 are shown.

A conveying area 12a in the figure is a portion of the U-turn path 12 formed by the frame 50. While conveyed in the U-turn path 12, the document S is conveyed within a range of the conveying area 12a in the width direction. Broken lines A and B are virtual lines extending from the outline of the pickup roller 3 in the horizontal direction, and the distance between A and B corresponds to a roll diameter of the pickup roller 3.

The sub control board 803 and the display unit 804 are located in the upper side of the conveying area 12a. At this time, the sub control board 803 and the display unit 804 are displaced from the pickup roller 3 without overlapping with the pickup roller 3 in an axial direction of the pickup roller 3, and arranged with an offset. Further, the sub control board 803 and the display unit 804 are located in a manner partly overlapping each other within the area between the broken lines A and B.

According to the above-described positional relationship of the constituent elements, in the sheet conveying apparatus of the present invention, a space occupied by the operation panel unit 800 does not significantly deviate from the space required for sheet conveyance in both the horizontal and vertical directions.

It should be noted that in the present embodiment, the pickup roller 3 and the separation roller 5, which are a conveying system, are located closer to the back side of the reading apparatus, while the operation panel unit 800, which is an operation system, is located closer to the front side of the reading apparatus. Locating the operation panel near the front makes it easy for the user to perform operation.

Locating the conveying system in a manner shifted in the sheet width direction (the width direction of the document sheet) crossing the sheet conveying direction may cause skewing in sheet conveyance. To suppress this, the positions in feeding and discharging are adjusted by the document stopper 15 of the U-turn path 12 and the discharge guide 19 of the open/close unit.

(Configuration of the Operation Panel Unit)

Figure 9A:
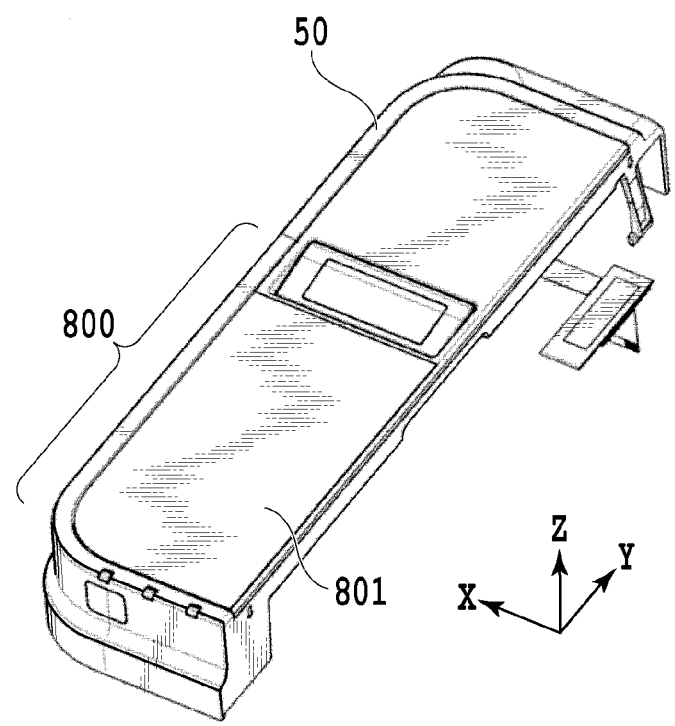
FIGS. 9A and 9B are views illustrating a configuration of the operation panel.
Figure 9B:
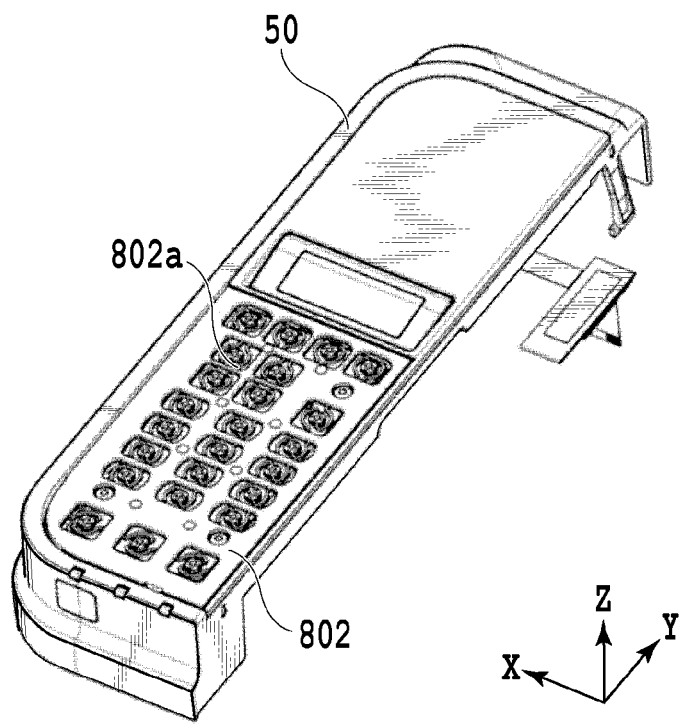

With reference to FIGS. 9A and 9B (hereinafter also collectively referred to as FIG. 9) and FIGS. 10A and 10B (hereinafter also collectively referred to as FIG. 10), a description will be given of a configuration of the operation panel unit 800 of the present embodiment.

FIG. 9A is a perspective view showing the operation panel unit 800 and the frame 50 of the present embodiment. FIG. 9B is a perspective view showing a state in which a surface sheet 801 is removed from the operation panel unit 800 shown in FIG. 9A. A cover 802 is a cover member which has the pressing unit 802a positioned between the surface sheet 801 and the sub control board 803 and can fit to the frame 50 to cover the top of the pickup roller 3 and the separation roller 5.

Figure 10A:
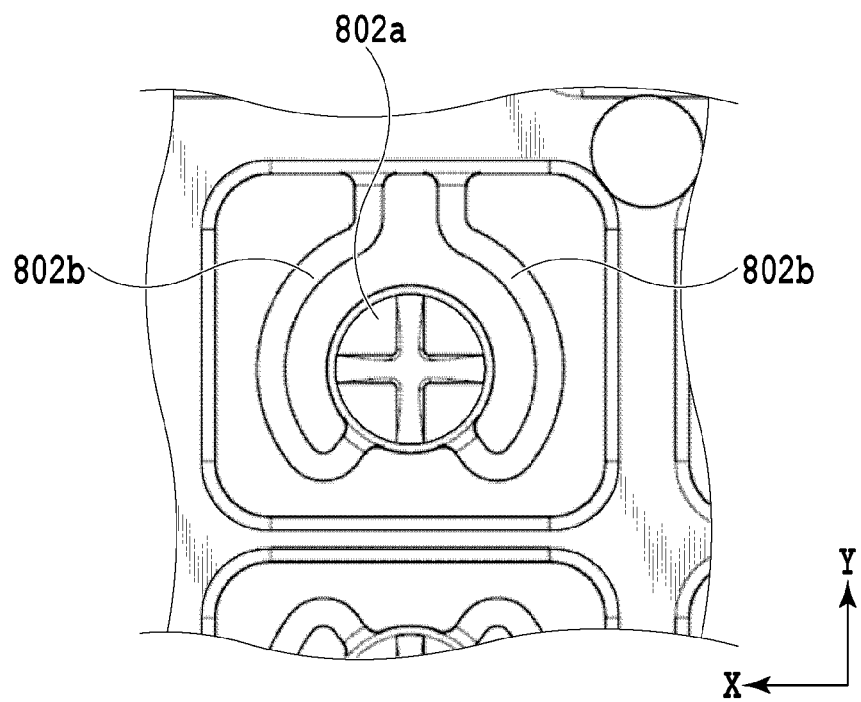
FIGS. 10A and 10B are views illustrating a button on the operation panel.
Figure 10B:
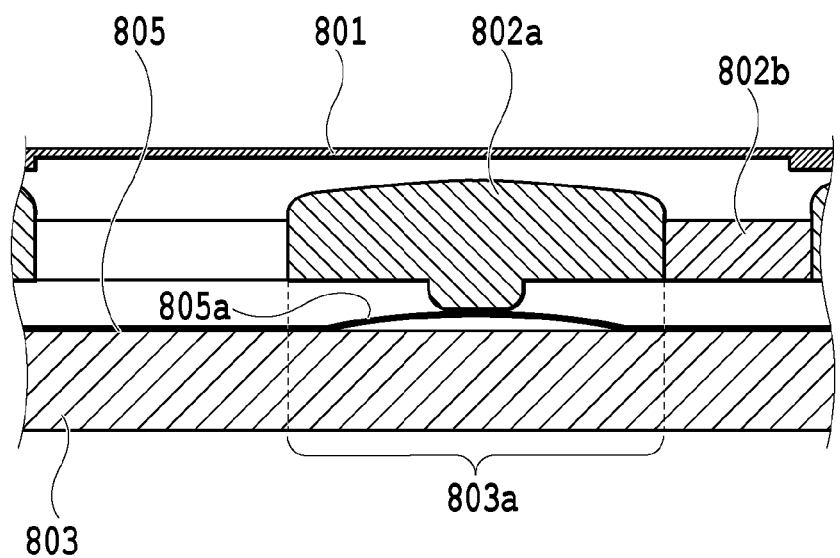

FIG. 10A is an enlarged view of the pressing unit 802a. FIG. 10B is a partly cross-sectional view of the operation panel unit 800. In FIG. 10, the pressing unit 802a is beam supported by a runner unit 802b within an area cut out in a frame of the cover 802 and is connected to the body of the cover 802. Further, a board sheet 805 is provided on the sub control board 803. The board sheet 805 has a so-called dome switch 805a formed of a metal thin plate on the board button 803a. If a center part of the dome switch 805a is pressed, the dome switch 805a is brought into conduction on the board.

During user operation, a user presses the surface sheet 801. This deforms the surface sheet 801 and brings the pressing unit 802a into contact with the dome switch 805a by using deflection of the runner unit 802b. Pressing allows the board button 803a to be switched between on and off.

In this manner, in the present embodiment, the board button 803a is switched between on and off by the pressing of the surface sheet 801, the runner unit 802b, the pressing unit 802a, and the dome switch 805a. Alternatively, constituent elements near the pressing unit may be integrally formed of elastic material such as rubber, and the board button 803a may be switched between on and off by using elastic force.

(Configuration of Cabling)

Figure 11:
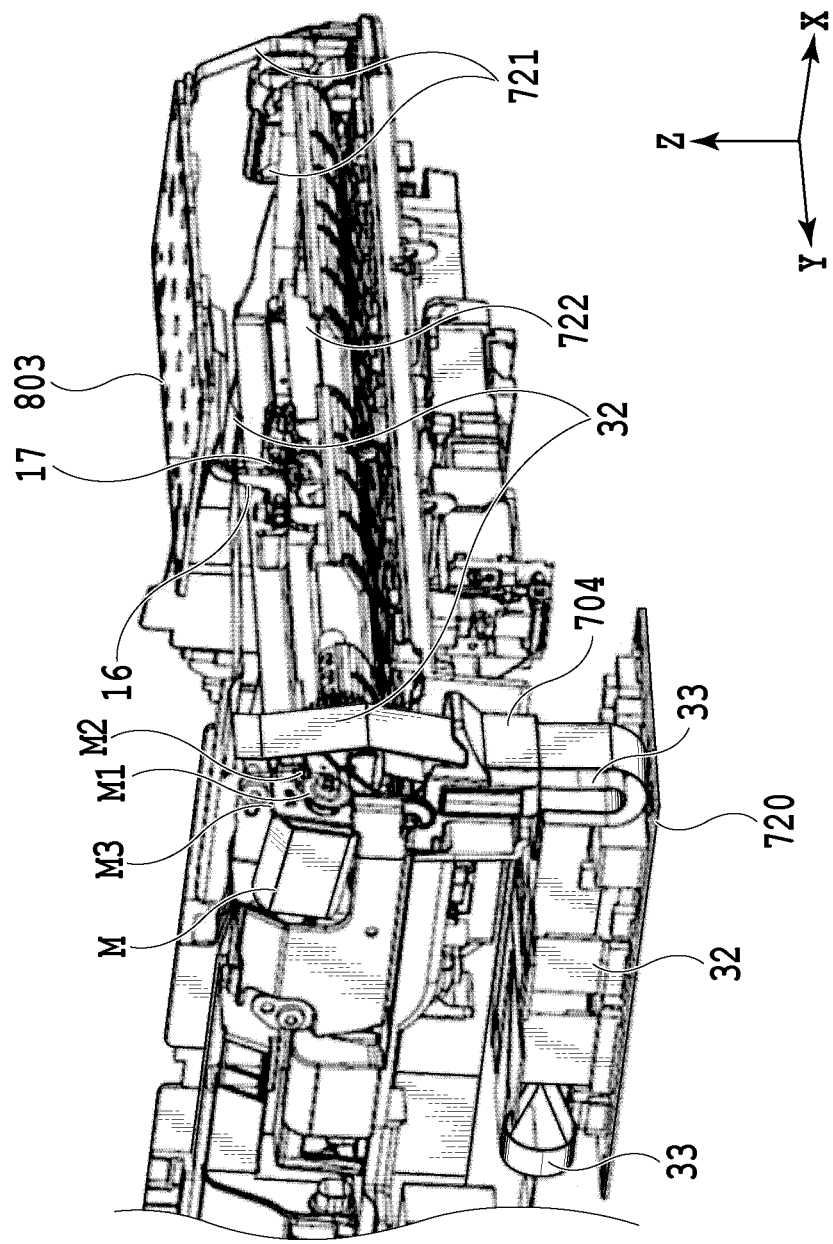
FIG. 11 is a view illustrating cabling of the reading apparatus.

With reference to FIGS. 7 and 11, a description will be given of a configuration of cabling of the present embodiment.

A first flexible flat cable (hereinafter also referred to as an FFC) 32 connects the sub control board 803 and the main control board 720. The first FFC 32 can transmit to the main control board 720 an operation signal from the sub control board 803, transmit a signal of the entire apparatus from the main control board 720 to the display unit 804 via the sub control board 803, and display information on the display unit 804.

The first FFC 32 connected to the sub control board 803 is routed on the U-turn path 12 to the outside of the U-turn path 12 near the back of the reading apparatus, and connected to the main control board 720. The first FFC is guided by a cable guide 704 near the back of the apparatus and routed not to be in contact with the motor M, the code wheel film M1, the encoder sensor M2, the encoder M3, and the gear train M4.

A second FFC 33 is routed from a sensor unit of the encoder M3, guided by the cable guide 704, and connected to the main control board 720. Inside the cable guide 704, the first FFC 32 and the second FFC 33 are separated from each other by a wall.

A third FFC 722 connects the document presence/absence sensor 16 and the document edge sensor 17. A fourth FFC 721 connected to the document edge sensor 17 is connected to the sub control board 803. Information from the document presence/absence sensor 16 and the document edge sensor 17 is transmitted to the main control board 720 via the fourth FFC 721, the sub control board 803, and the first FFC 32.

The drive motor M and a distribution cable for supplying power to the drive motor M is connected to the main control board 720. At this time, the first FFC 32, the third FFC 722, and the fourth FFC 721 are routed away from the drive motor M and its distribution cable through a different path not to be in contact with the drive motor M and its distribution cable. More specifically, in the present embodiment, the operation system is separated from the driving system (in particular, the motor M, which is a driving source, and its cabling). The reason is given as follows.

The drive motor M uses a large amount of power and occasionally causes noise. Further, the distribution cable of the drive motor M often causes radiation noise. Accordingly, the operation system is separated from the driving system, so as to reduce impact on operations performed on the operation panel unit or the like made by the noise generated from the drive motor M and its distribution cable. The motor M, which is a driving source, is located near the back of the apparatus, and the operation panel is located near the front of the apparatus. This configuration is particularly preferable in employing a brushed DC motor, which is not expensive as a driving source but tends to cause spark noise by friction of a brush.

(The Open/Close Unit and the Conveying Unit)

Figure 12:
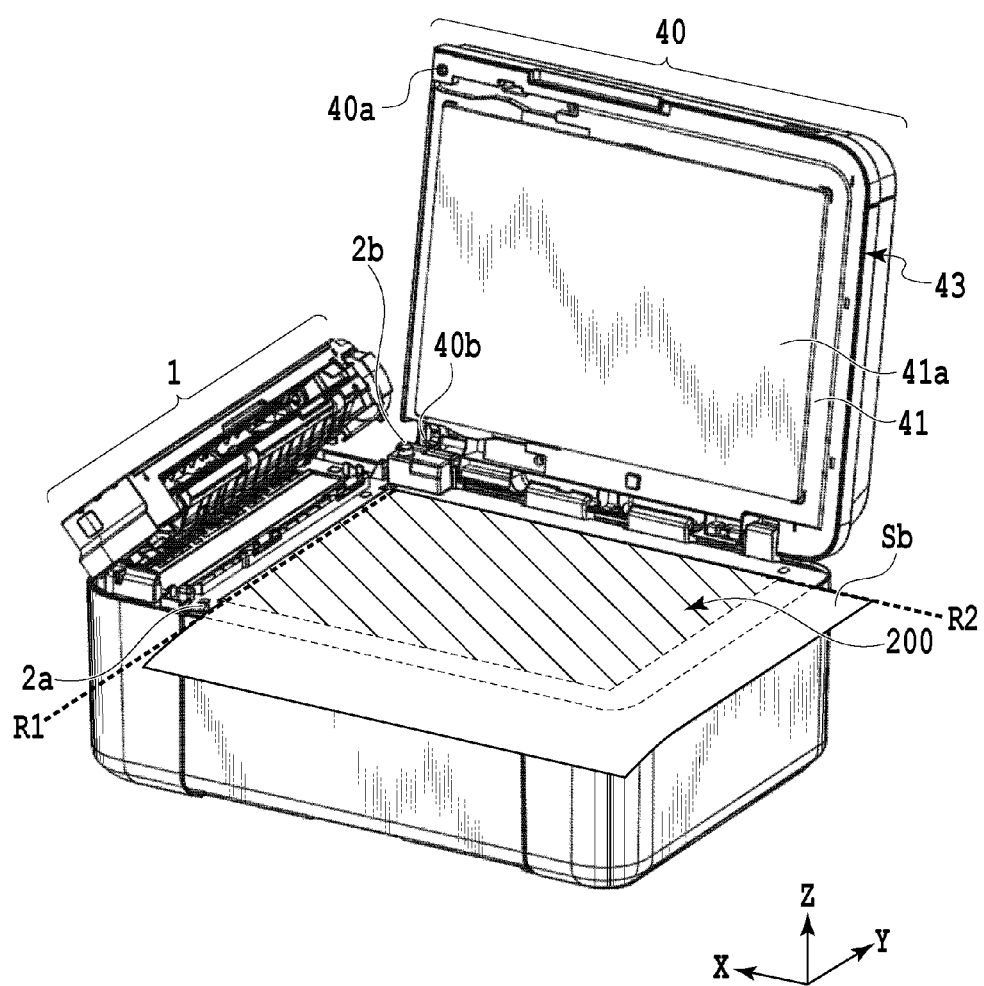
FIG. 12 is a perspective view illustrating the case of reading a large-format document.
Figure 13:
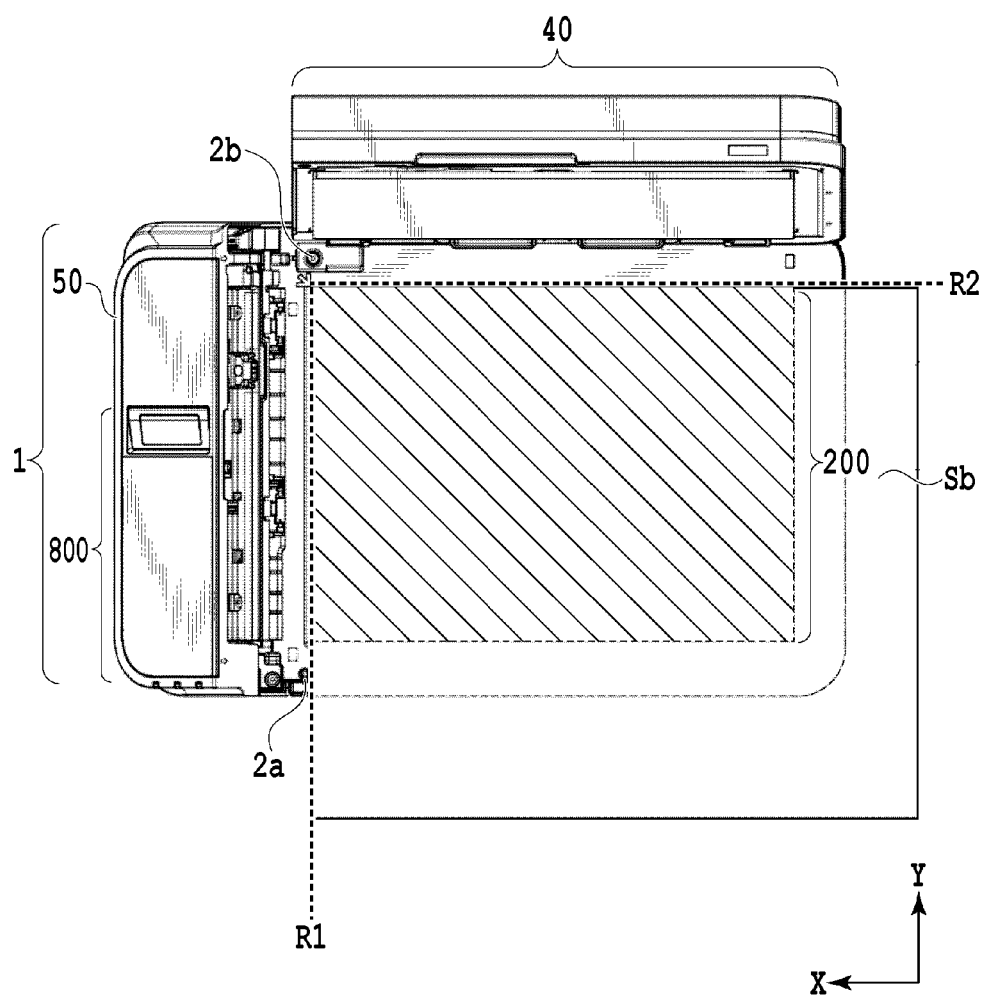
FIG. 13 is a top view of FIG. 12.

A description will be given of the case of reading a document that is larger than the glass plate 22 of the document platen. FIGS. 12 and 13 show a state in which the document B is placed on the book document reading unit 2 shown in FIG. 5. In this example, a large-format document Sb is used as the document B.

A document reading area 200 shown by oblique lines in FIGS. 12 and 13 corresponds to an area on an upper surface of the glass plate 22, and the CIS 311 can read the document within this area. The document for reading is set on the document reading area 200 so that two sides of the document align with reference lines R1 and R2 for butting as shown by broken lines. Even in the case of reading the large-format document Sb that is larger in size than the document reading area 200, providing reference lines (alignment references) on the sides of the conveying unit 1 and the hinge of the open/close unit 40 can prevent the document Sb from being folded and bent. As described above, the alignment references for a document placed on the document platen to be read by the flatbed scanner unit are provided on the side of the conveying unit. The flatbed scanner unit then starts scanning from the side of the alignment references.

As shown in FIG. 12, the open/close unit 40 has a document presser unit 43. The document presser unit 43 has a base plate 41 and a document reading white plate 41a.

The document presser unit 43 has a function of pressing the document B with the document reading white plate 41a in flatbed scan. The document presser unit 43 is attached to the book document reading unit 2 via the hinges 42a and 42b of the base plate 41. As described above, the hinges 42a and 42b are rotatable around the axis. When the open/close unit 40 becomes open by the hinges 42a and 42b, the document B can be set.

The open/close unit 40 has engaging parts 40a and 40b that are engaged when the open/close unit 40 is closed for alignment in forward, backward, left, and right directions (horizontal direction), and the book document reading unit 2 is provided with engaging parts 2a and 2b that respectively mate with the engaging parts 40a and 40b. In this example, the engaging parts 40a and 40b are shown as concave units and the engaging parts 2a and 2b are shown as convex units. However, the concave-convex relationship may be opposite or the concave-convex relationship in combination may be used. Further, the positions of engaging parts and the number of engaging parts should not be limited to the present example. As a distance between the engaging part and the hinge increases, an alignment effect tends to be greater, and the increased distance allows the outer appearance of the apparatus to be preferable.

Further, if the engaging parts are located outside the document reading area 200 of the book document reading unit 2 and on a side on which the reading starts relative to the reference line R1, it is easy to suppress, in ADF scan, skewing at the time of supplying the document S and displacement of the loaded document at the time of discharging. With this configuration, when a document having a size that is out of the document reading area 200 such as the large-format document Sb is placed, it is possible to prevent the document from overlapping with the convex engaging part, and to perform reading of the large-format document Sb without scratching it.

The frame 50 of the conveying unit 1 is attached to the book document reading unit 2 via the hinge, and is rotatable around the hinge axis with respect to the book document reading unit 2. If the frame 50 is open, the front of the U-turn path becomes wide-open. For instance, if a jam occurs in the U-turn path 12 while the document S is conveyed, opening the frame 50 allows the user to easily remove the document S from the U-turn path 12.

Further, by setting the axial direction of the hinge to a direction that is different from the axial direction of the hinges 42a and 42b (an orthogonal direction in this example), the opening direction of the frame 50 differs from the opening direction of the open/close unit 40. By opening the open/close unit 40 that is located upstream and downstream of the U-turn path 12 while being closed, it is possible to easily remove the document S from the upstream portion and downstream portion of the U-turn path 12 and facilitate user access to the U-turn path 12.

In the above-described embodiment, the operation panel is integrated into the conveying unit, and the operation panel and the conveying roller are displaced with respect to each other in the sheet width direction crossing the sheet conveying direction. The operation panel and the conveying roller are located in a manner at least partly overlapping each other in the sheet conveying direction and the height direction of the conveying unit. Further, the operation panel and the conveying roller are at least partly located within a range of the width of the sheet conveying area by the conveying unit. This configuration achieves an apparatus that is downsized as compared with a conventional apparatus, without impairing performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-264542 filed on Dec. 26, 2014, which is hereby incorporated by reference wherein in its entirety.

What is claimed is:

1. An image reading apparatus comprising:
    a scanner unit configured to read a document on a document platen;
    a document presser unit configured to press the document against the document platen, the document presser unit being openable with respect to the document platen;
    a conveying unit having a driving roller and being placed on the scanner unit, the conveying unit configured to convey a document one by one along a conveying path for reading by the scanner unit; and
    an operation panel integral with the conveying unit, wherein the operation panel and the conveying unit with the driving roller are openable with respect to the scanner unit independently of the opening of the document presser unit.

2. The image reading apparatus according to claim 1, wherein the operation panel and the driving roller are displaced from each other in a width direction of the document that is perpendicular to a conveying direction of the conveying path.

3. The image reading apparatus according to claim 2, wherein the operation panel and the driving roller are located in a manner at least partly overlapping each other in the conveying direction and a height direction in the conveying unit.

4. The image reading apparatus according to claim 1, wherein the document presser unit is openable with a hinge having a first rotational axis located on a rear side of the apparatus in the width direction, and the conveying unit is operable with a second hinge having a second rotational axis that is perpendicular to the first rotational axis.

5. The image reading apparatus according to claim 4, wherein the driving roller is located on the rear side of the apparatus in the width direction and the operation panel is located on a front side of the apparatus in the width direction.

6. The image reading apparatus according to claim 5, wherein the conveying path includes a U-turn path located under the operation panel.

7. The image reading apparatus according to claim 6, further comprising a supply tray and a discharge tray each provided with the document presser unit, wherein a document on the supply tray is conveyed through the U-turn path in the conveying unit, read by the scanner unit, and discharged to the discharge tray.

8. The image reading apparatus according to claim 1, further comprising:
    a main control board for controlling the entire image reading apparatus; and
    a sub-control board embedded in the conveying unit for controlling the operation panel.

9. The image reading apparatus according to claim 8, wherein a cable connected to the sub-control board from the main control board is wired without contacting with a driving motor of the driving roller and is wired through a path that is different from a path of a power cable of the driving motor.

10. The image reading apparatus according to claim 8, further comprising a sensor located in the conveying unit, wherein a cable of the sensor is wired without contacting with the driving motor and a power cable of the driving motor.

11. The image reading apparatus according to claim 1, wherein in a case where both the conveying unit and the document presser unit are closed, the conveying unit and the document presser unit have substantially the same height near a boundary between the conveying unit and the document presser unit.

12. The image reading apparatus according to claim 1, wherein an alignment reference for the document placed on the document platen to be read by the scanner unit is provided on a side of the conveying unit, and the scanner unit starts scanning from a side of the alignment reference.

13. The image reading apparatus according to claim 12, wherein an engaging part that engages with the document presser unit when the document presser unit is closed is provided closer to the conveying unit than the alignment reference and near a front of the apparatus, the engaging part being concave or convex.

* * * * *